United States Patent [19]
Pluff et al.

[11] Patent Number: 5,909,782
[45] Date of Patent: Jun. 8, 1999

[54] CYLINDRICAL MEMBER WITH REDUCED AIR FLOW RESISTANCE

[76] Inventors: Frederic L. Pluff; Paula N. Pluff, both of 3 Bancroft Rd., Newton, N.H. 03858

[21] Appl. No.: 08/797,431

[22] Filed: Feb. 10, 1997

[51] Int. Cl.$^6$ .................................................. B60K 13/04
[52] U.S. Cl. ............................................ 180/309; 138/39
[58] Field of Search .................................... 180/309, 903; 137/803, 808; 138/37–39; 244/130, 198, 199; 296/180.2

[56] References Cited

U.S. PATENT DOCUMENTS

| | | | |
|---|---|---|---|
| 3,636,983 | 1/1972 | Keyser | 138/39 |
| 3,741,285 | 6/1973 | Kuethe | 165/1 |
| 4,059,129 | 11/1977 | Feis | 138/37 |
| 4,225,102 | 9/1980 | Rao | 244/130 |
| 4,284,302 | 8/1981 | Drews | 296/15 |
| 4,540,143 | 9/1985 | Wang et al. | 244/130 |
| 4,699,340 | 10/1987 | Rethorst | 244/199 |
| 4,706,910 | 11/1987 | Walsh et al. | 244/130 |
| 4,813,366 | 3/1989 | Elder | 114/61 |
| 4,813,635 | 3/1989 | Paterson et al. | 244/130 |
| 4,930,729 | 6/1990 | Savill | 244/200 |
| 4,932,612 | 6/1990 | Blackwelder et al. | 244/207 |
| 5,023,958 | 6/1991 | Rotzin | 2/411 |
| 5,207,270 | 5/1993 | Yokoyama et al. | 165/151 |
| 5,282,560 | 2/1994 | Ozog | 244/130 |

*Primary Examiner*—Matthew C. Graham
*Assistant Examiner*—C. T. Bartz
*Attorney, Agent, or Firm*—Hamilton, Brook, Smith & Reynolds, P.C.

[57] ABSTRACT

An elongate member for positioning transverse to a fluid flow includes a curved outer surface. A first elongate flow transition inducing structure is positioned on and extends along a substantial length of the outer surface of the elongate member transverse to the fluid flow between about 50° and 80° away from the fluid flow for reducing fluid flow resistance on the elongate member.

18 Claims, 7 Drawing Sheets

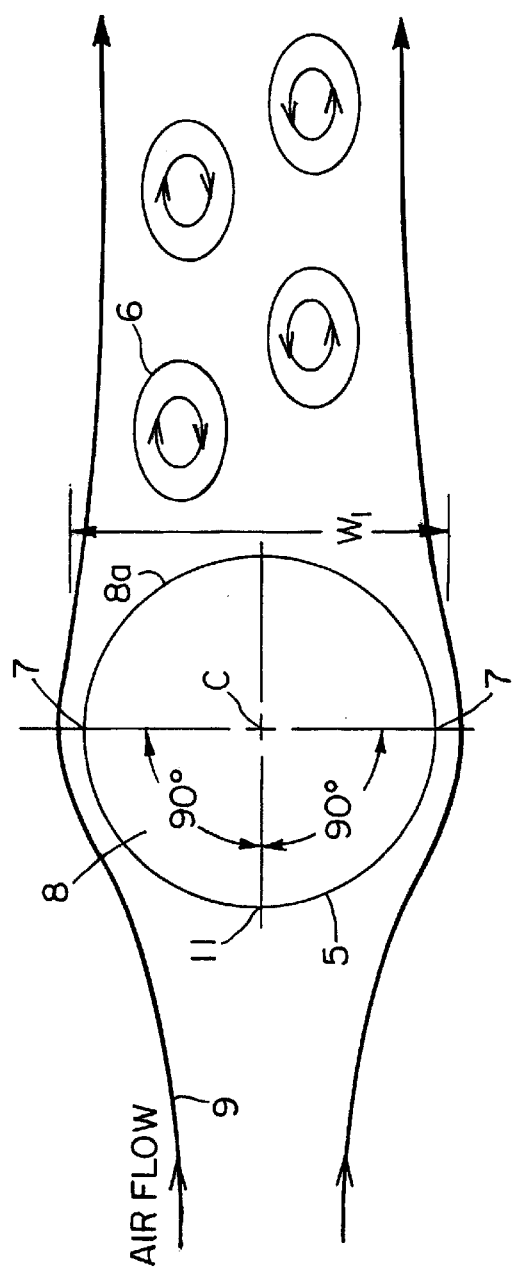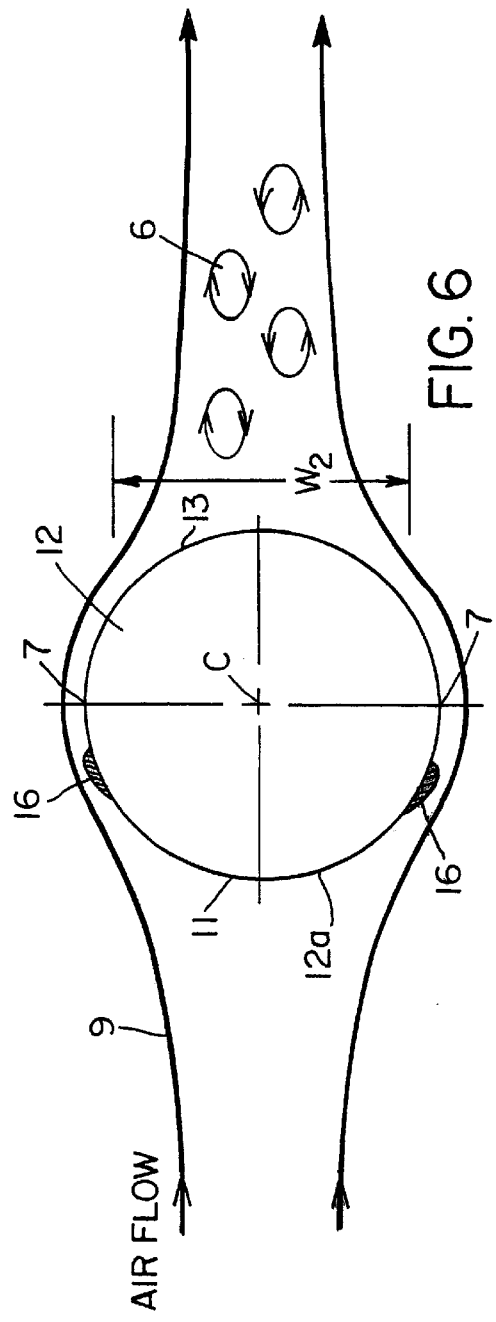

CYLINDRICAL MEMBER WITH REDUCED AIR FLOW RESISTANCE

BACKGROUND

Vehicles such as trucks, bicycles or motorcycles, often have cylindrically shaped members which are exposed to transverse air flow during travel creating a certain amount of drag force on the vehicles. In bicycles and motorcycles, an example of such cylindrical members are the handle bars as well as portions of the frame. In trucks, an example of such cylindrical members are the exhaust stacks, air filter housings and rear view mirror mounts.

SUMMARY OF THE INVENTION

The present invention provides an approach that reduces transverse air flow resistance on cylindrical members. The present invention is directed towards an elongate member having a curved outer surface that is positioned transverse to a fluid flow and includes a first elongate flow transition inducing structure positioned on and extending along a substantial length of the outer surface of the elongate member transverse to the fluid flow between about 50° and 80° away from the fluid flow for reducing fluid flow resistance on the elongate member.

In preferred embodiments, the elongate member is cylindrical in shape and includes a second elongate flow transition inducing structure positioned on and extending along substantial length of the outer surface of the elongate member transverse to the fluid flow between about 50° and 80° away from the fluid flow for further reducing fluid flow resistance on the elongate member. The second elongate flow transition inducing structure is positioned on the outer surface on the opposite side from the first elongate flow transition inducing structure. The first and second flow transition inducing structures are preferably protuberances extending above the outer surface of the elongate member. Each protuberance has a tear-drop shaped cross-section with a trailing edge that is thicker than the leading edge. The protuberances are between about 0.001 to 0.100 inches thick, between about 1/16 inches to 5/8 inches long and are each most preferably positioned at about 65° away from the fluid flow.

By reducing the air flow resistance of essential cylindrical members on vehicles such as trucks, bicycles and motorcycles, such vehicles can be operated more efficiently.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

FIG. 1 is a schematic drawing of air flowing around a prior art cylindrical exhaust stack.

FIG. 6 is a cross-sectional schematic drawing showing air flowing around the present invention exhaust stack.

DETAILED DESCRIPTION OF THE PREFERRED EMBODIMENTS

Figure 2:
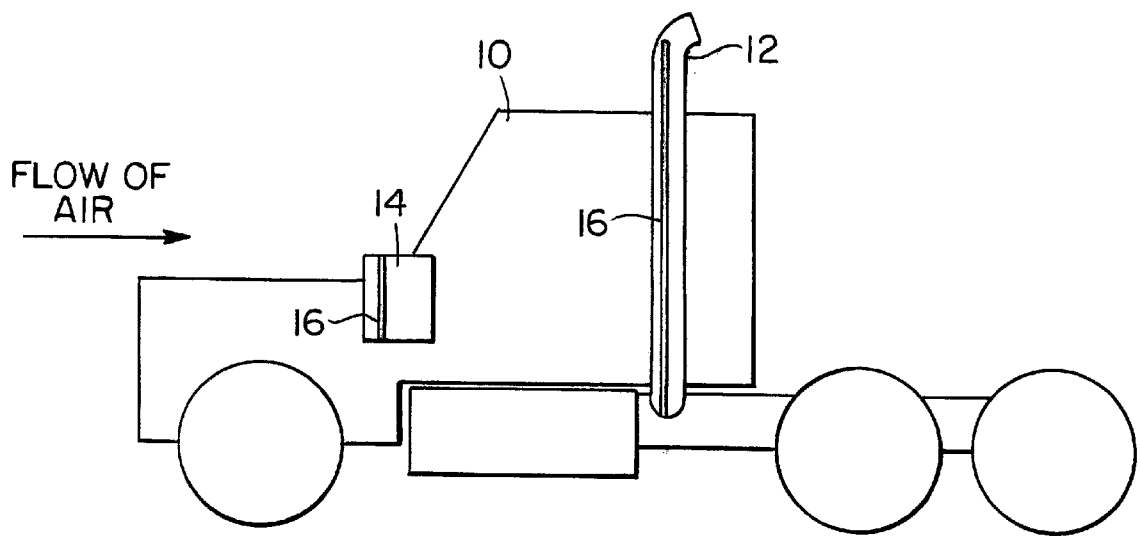
FIG. 2 is a side view of a truck with an exhaust stack and air cleaner made in accordance with the present invention for reducing air flow resistance.
Figure 3:
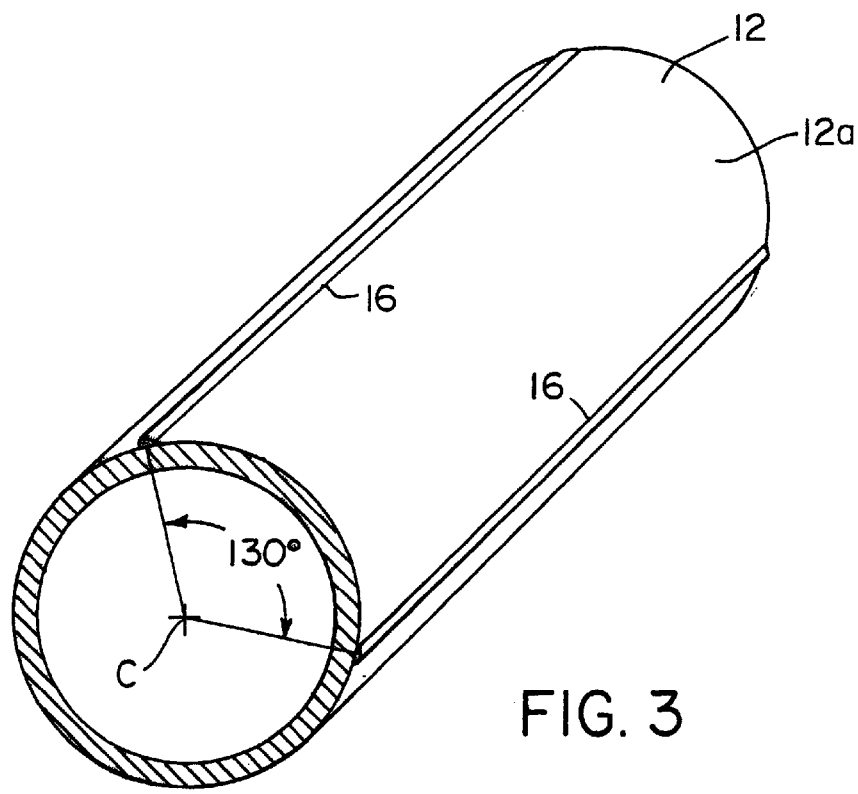
FIG. 3 is a perspective view of a portion of the exhaust stack of FIG. 2.
Figure 4:
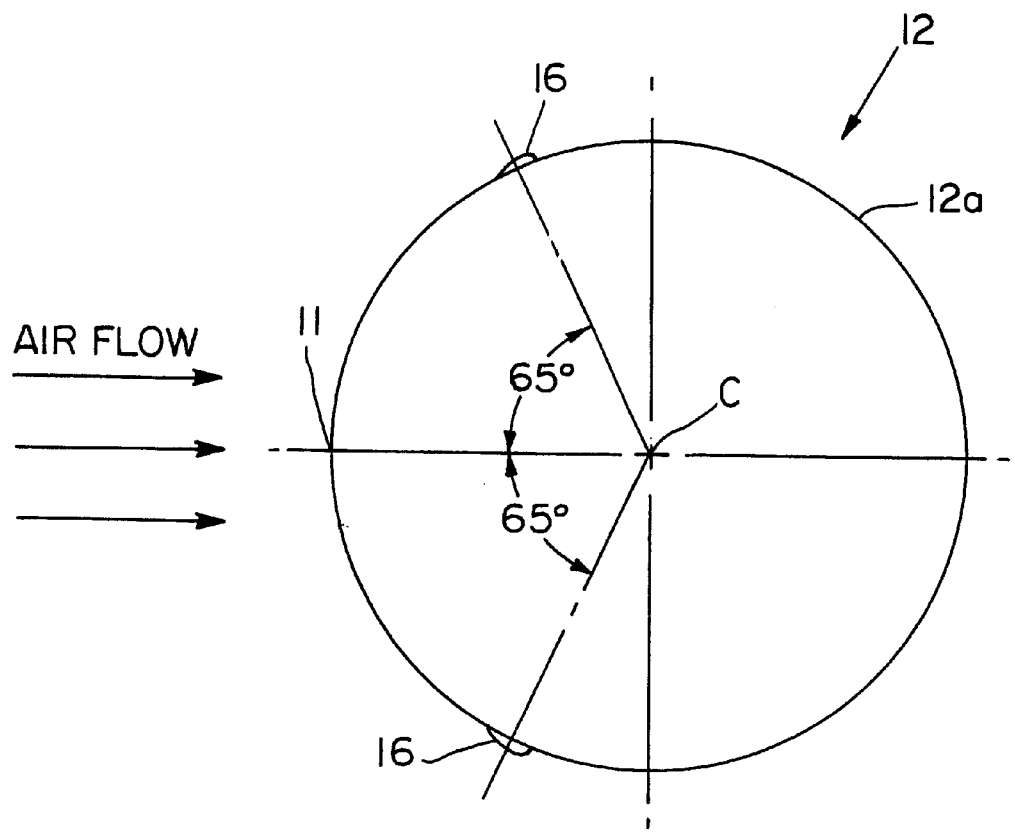
FIG. 4 is a cross-sectional schematic drawing of the present invention exhaust stack showing the placement of two protuberances.
Figure 5:
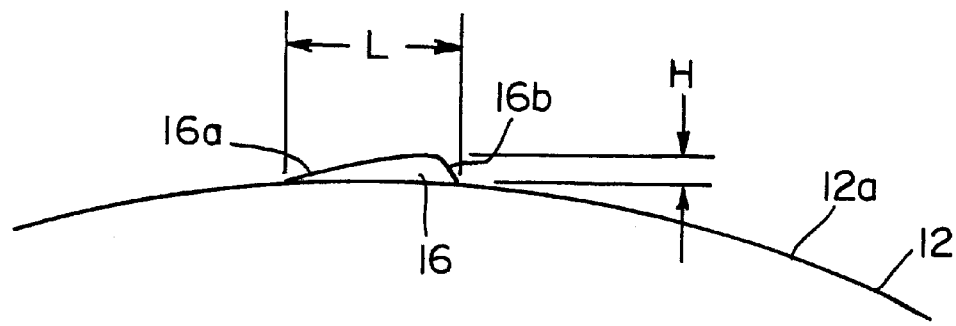
FIG. 5 is an enlarged view of a protuberance on the outer surface of the present invention exhaust stack.

FIG. 1, depicts an air flow 9 flowing over a standard cylindrical exhaust stack 8 on a truck as the truck is traveling forward. The air flow 9 flows over the front half of the exhaust stack 8 in a laminar fashion and then separates from the exhaust stack 8 into turbulent flow at points 7 on outer surface 5 (at about 90° relative to the direction of air flow 9 as measured from center C). The air flow 9 has an initial flow separation width $W_1$ as it separates from exhaust stack 8 which is about as large as the diameter of exhaust stack 8. A series of eddy vortices 6 are created on the leeward side 8a of exhaust stack 8 which continuously form and break away from exhaust stack 8 due to a large adverse pressure gradient existing on the leeward side 8a of exhaust stack 8. Vortices 6 exert a suction force on approximately the entire leeward side 8a of exhaust stack 8. This suction forms part of the air flow resistance on exhaust stack 8 and is known as pressure drag.

Referring to FIG. 2, truck 10 includes an exhaust stack 12 and an air cleaner housing 14 made in accordance with the present invention resulting in reduced air flow resistance on the exhaust stack 12 and air cleaner housing 14. The following discussion describes exhaust stack 12 but does not describe air cleaner housing 14 separately because the same approach which is taken for reducing the air flow resistance of exhaust stack 12 applies to air cleaner housing 14.

Referring to FIGS. 2, 3, 4 and 5, exhaust stack 12 is generally cylindrical and includes two elongate tear-drop shaped protuberances 16 located on opposite sides of the upstream portion of the outer surface 12a. Protuberances 16 extend along the length of exhaust stack 12 and have a leading edge 16a which is narrower than the following edge 16b. The protuberances 16 are spaced apart from each other between about 100° and 160°. The most preferable spacing of protuberances 16 is about 130° apart from each other wherein the thickest portion of each protuberance 16 is positioned on the outer surface 12a of exhaust stack 12 at a 65° angle away from the front 11 of exhaust stack 12 (as measured from the center C). Each protuberance 16 has a height H above the outer surface 12a preferably ranging between about 0.001 inches to 0.100 inches with 0.015 inches being the most preferable. The length L of protuberances 16 is preferably in the range of about 1/16 inches to 5/8 inches with 1/2 inch being the most preferable. Typically, the larger the diameter of exhaust stack 12, the larger protuberances 16 should be to operate effectively. It should be noted that the leading edges 16a of protuberances 16 may be extended forward resulting in a leading edge having a very shallow slope. Although the cross section of protuberances 16 is preferably tear-drop shaped, the protuberances 16 can alternatively have other suitable cross sectional shapes such as circular, triangular or trapezoidal cross sections. Protuberances 16 are preferably metal and manufactured as part of exhaust stack 12 but alternatively, can be made of other materials capable of being adhered to exhaust stack 12. In addition, although exhaust stack 12 preferably has two protuberances 16, alternatively only one protuberance 16 can be used. One protuberance 16 will work about ⅔ as effectively for reducing air flow resistance as two protuberances 16.

Referring to FIG. 6, when truck 10 is traveling forward (typically at 65 mph), the protuberances 16 change the air flow 9 flowing over the outer surface 12a of exhaust stack 12 from laminar boundary layer flow to turbulent boundary layer flow before the air flow 9 reaches points 7 (at 90° relative to the direction of air flow 9). This energizes the lower levels of the boundary layer thereby increasing the speed at which the air flow 9 passes over the outer surface 12a downstream from the protuberances 16. Part of the suction force on the leeward side 13 of exhaust stack 12 is overcome by the air flow 9 due to its increased momentum enabling air flow 9 to flow close to the outer surface 12a longer than obtainable without protuberances 16. In fact, air flow 9 flows close to the outer surface 12a on a portion of the leeward side 13 of exhaust stack 12. The air flow 9 has an initial flow separation width $W_2$ as it separates from the leeward side 13 of exhaust stack 12. The flow separation width $W_2$ is smaller than the flow separation width $W_1$ of a conventional exhaust stack 8. Consequently, the suction force caused by vortices 6 on the leeward side 13 of exhaust stack 12 is exerted over a smaller area than on a conventional exhaust stack 8 having the same diameter. As a result, there is a smaller air flow resistance on exhaust stack 12 than on a conventional exhaust stack 8. Exhaust stack 12 operates best when the Reynolds number is below about $5 \times 10^5$ to $8 \times 10^5$.

Figure 7:
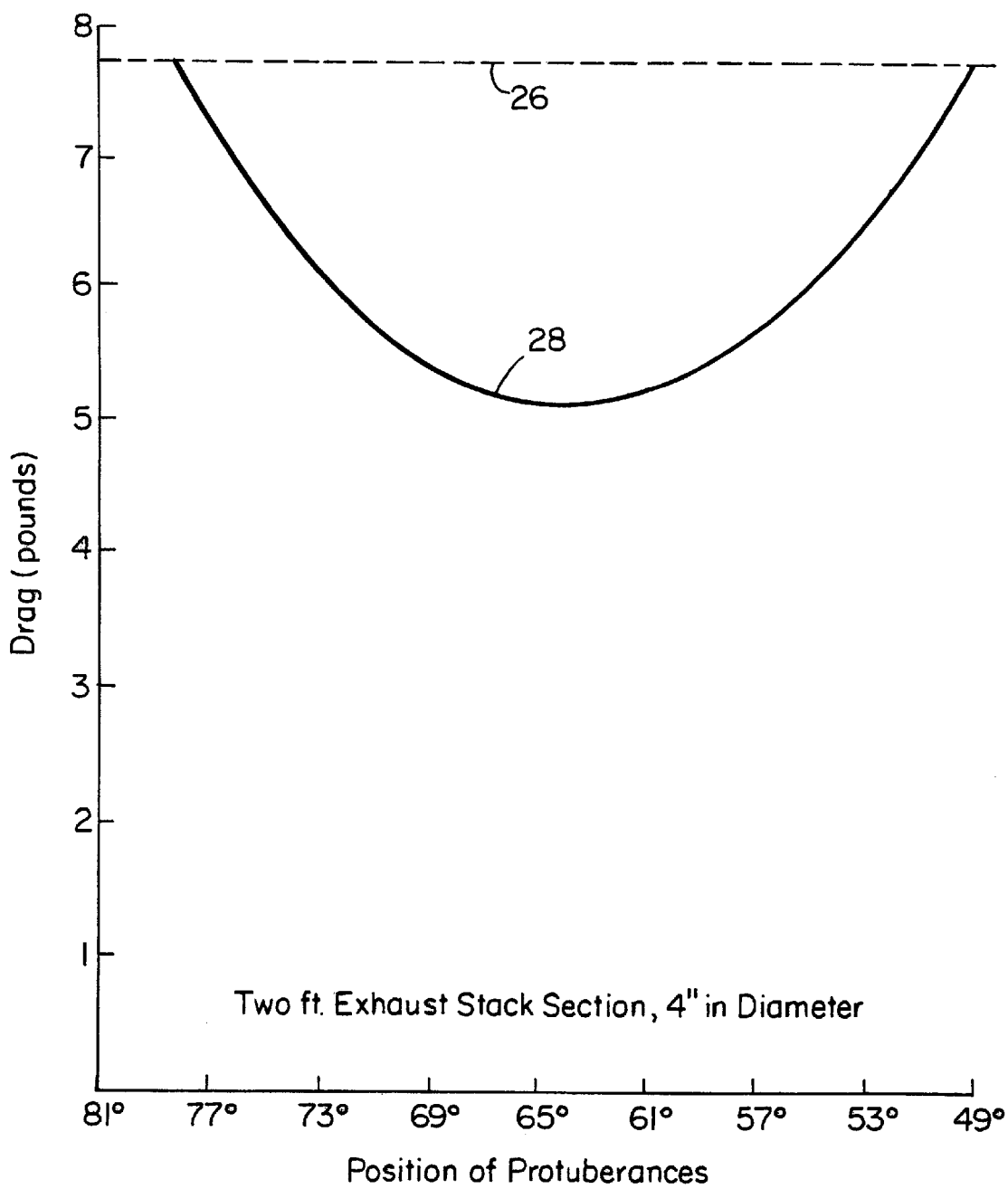
FIG. 7 is a graph depicting the air flow resistance of a prior art exhaust stack versus the present invention exhaust stack for different angular positions of the protuberances.

FIG. 7 depicts test results of air flow resistance at an air flow speed of 65 mph for a two foot long section of a 4 inch diameter exhaust stack 12 for different angular locations of protuberances 16 on outer surface 12a (designated by curve 28). For comparison, curve 26 designates air flow resistance test results for a two foot long section of a conventional 4 inch diameter cylindrical exhaust stack 8. As can be seen from the graph, locating protuberances 16 at about 65° away from the air flow 9 results in the lowest air flow resistance (about 2.5 lbs. less than the air flow resistance for exhaust stack 8). Since the test results are for a two foot section, this is equivalent to a reduction in air flow resistance of about 1.25 lbs. per linear foot. For a truck having two exposed four foot sections of exhaust stack, a 10 lb. reduction of air flow resistance can be made by employing exhaust stack 12 instead of a conventional exhaust stack 8. It can be seen from the graph that positioning protuberances 16 in the range between about 50° and 80° away from the air flow 9 will reduce air flow resistance.

Figure 8:
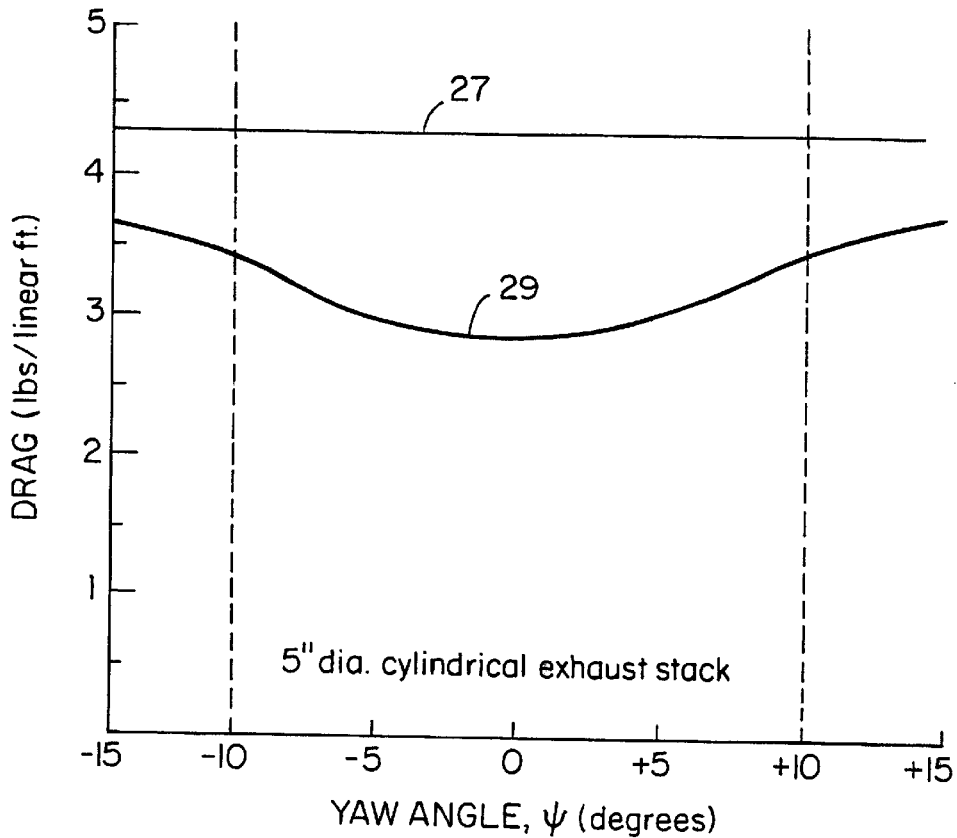
FIG. 8 is a graph depicting the air flow resistance of a prior art exhaust stack versus the present invention exhaust stack for different air flow angles.

FIG. 8 depicts test results for the air flow resistance per linear foot of a five inch diameter exhaust stack 12 for yaw angles of air flow 9 between ±15° at an air flow speed of 65 mph (designated by curve 29). Yaw angle is the angular direction at which the air is flowing relative to the front 11 of the exhaust stack 12. Yaw angles are often caused by cross winds when the truck is traveling forward. The air flow resistance of exhaust stack 12 is at a minimum (less than 3 lbs.) when the direction of the air flow 9 heads directly towards the front 11 of exhaust stack 12 (a yaw angle of 0°). For comparison, the air flow resistance per linear foot for a conventional 5 inch diameter exhaust stack 8 is depicted by curve 26 and is about 4.25 pounds. Therefore, at a yaw angle of 0°, the exhaust stack 12 has an air flow resistance which is about 1.25 lbs./ft less than a conventional exhaust stack 8. As can be seen in the graph, the 1.25 lbs./ft. reduction of air flow resistance also exists for yaw angles between about ±7°. However, if the air flow 9 is at a 15° yaw angle (±15°) the air flow resistance is only reduced about 0.75 lbs./ft. For a truck traveling at 65 mph, the yaw angle of air flow 9 over exhaust stack 12 exceeds ±10° less than about 10% of the time.

Figure 9:
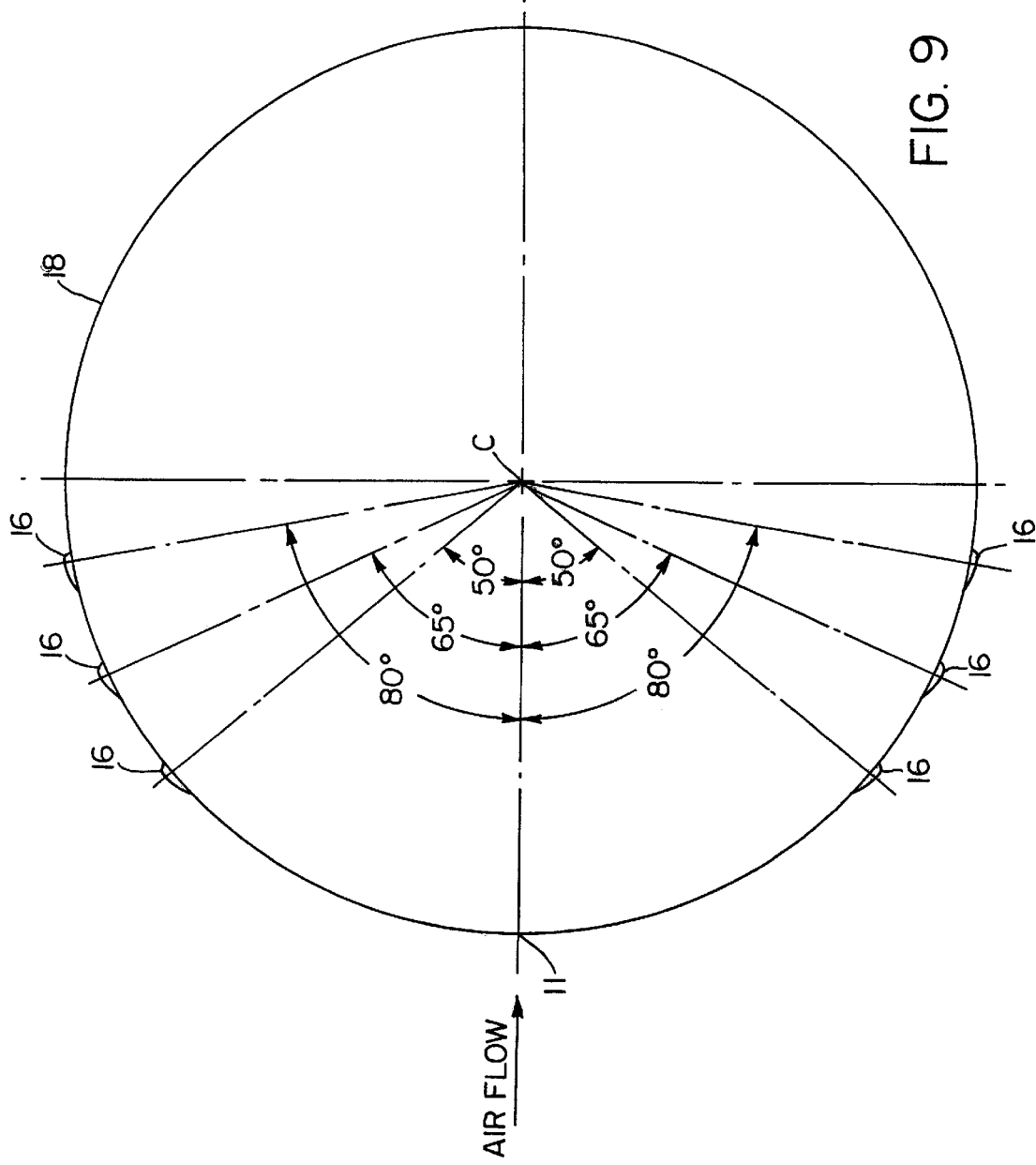
FIG. 9 is a cross-sectional schematic drawing of another preferred exhaust stack.

FIG. 9 depicts another preferred exhaust stack 18 which includes more than two protuberances 16. Exhaust stack 18 includes six protuberances 16 which are located on the outer surface 18a of exhaust stack 18 at ±50°, ±65° and ±80° away from the front 11 of exhaust stack 18. The multiple protuberances 16 on exhaust stack 18 handle high cross winds better than the two protuberances 16 of exhaust stack 12 but do not reduce air flow resistance as effectively when the air flow is flowing at a yaw angle of 0°. Although six protuberances 16 are depicted at particular angles, the number of protuberances 16 and the locations can be varied as long as the protuberances are between about ±50° and ±80°.

Figure 10:
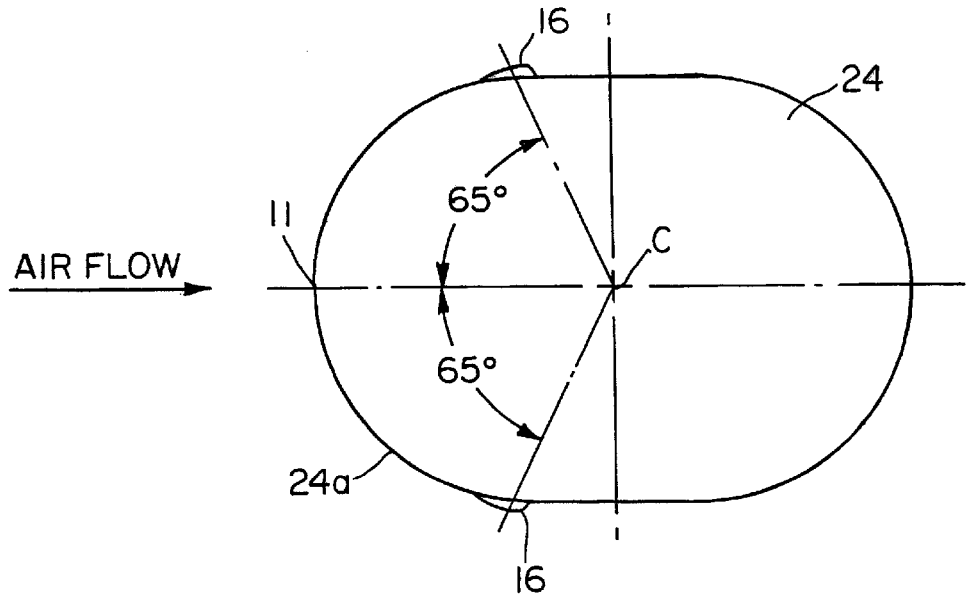
FIG. 10 is a cross-sectional schematic drawing of still another preferred exhaust stack.

FIG. 10 is another preferred exhaust stack 24 which has an elliptical cross-section rather than a circular cross section. Protuberances 16 are positioned on the outer surface 24a at about 65° away from the front 11 of exhaust stack 24. The advantage of exhaust stack 24 is that for a given cross-sectional area, the width of exhaust stack 24 facing the air flow is less than the width of exhaust stack 12. A drawback of exhaust stack 24 is that it is less effective in cross winds than exhaust stack 12 because of the increased surface area on the sides.

Figure 11:
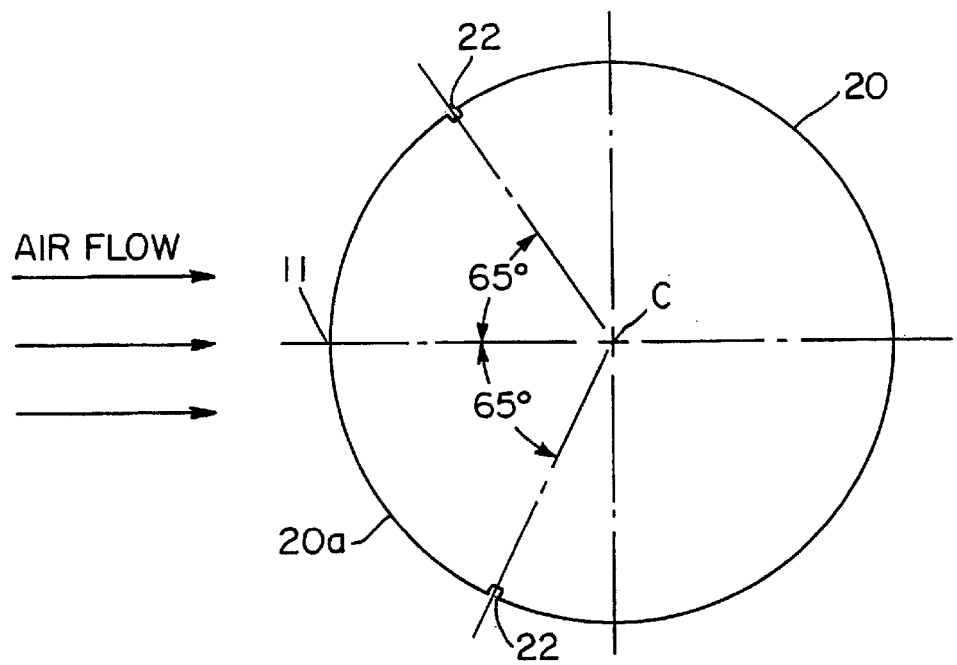
FIG. 11 is a cross-sectional schematic drawing of yet another preferred exhaust stack.

FIG. 11 depicts still another preferred exhaust stack 20 which includes two elongate indentations 22 extending along on the outer surface 20a instead of two elongate protuberances 16. Indentations 22 provide the same effect as protuberances 16 but are less desirable in that they may possibly cause stress concentrations. Alternatively, indentations 22 can be substituted with elongate lines formed from a series of dimples, a series of scratch lines, or a roughened surface such as that capable of being formed by sand blasting.

Figure 12:
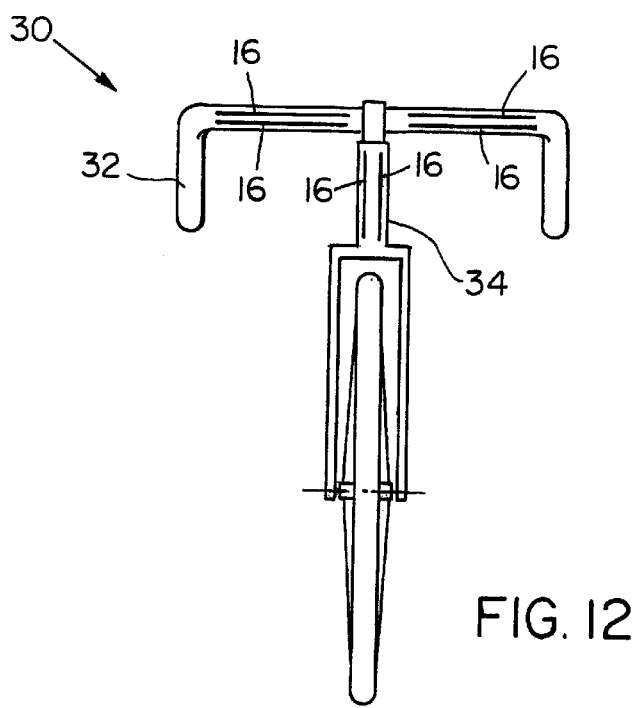
FIG. 12 is a front view of a bicycle in which the handle bars and frame are made in accordance with the present invention and include protuberances for reducing air flow resistance.

FIG. 12 is yet another preferred embodiment of the present invention. Bicycle 30 includes a set of handle bars 32 which are mounted to a post 34 at the front of the bicycle 30. The handle bars 32 and post 34 include protuberances 16 in the manner described above for reducing air flow resistance. Although not shown, protuberances 16 can be applied to other portions of the frame of bicycle 30. The protuberances 16 can also be applied to the frame members of motorcycles, mopeds and motor scooters for reducing air flow resistance. In addition, the protuberances 16 can be replaced with indentations 22, or a line of dimples or a roughened or scratched surface as mentioned above.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, although the present invention has been depicted to reduce air flow resistance on the exhaust stacks and air cleaners of trucks as well as for reducing the wind resistance on the forward portions of a bicycle, the present invention can be employed for reducing the fluid resistance of any elongate member having a curved outer surface positioned transverse to a fluid flow as long as the leeward surface is widely curved. This can include liquids as well as gases other than air. The elongate member can also be tapered along its length. Although the flow transition inducing structures are shown to be continuous or uninterrupted along the outer surfaces of the elongate members, alternatively, the structures can have interruptions or can be truncated. However, such interruptions or truncations are less desirable.

What is claimed is:

1. An elongate member for positioning transverse to a fluid flow, the elongate member having a curved outer surface, a first elongate substantially uninterrupted flow transition inducing structure being positioned on and extending along a substantial longitudinal length of the outer surface of the elongate member transverse to the fluid flow in the range of 50° to 80° away from the fluid flow for reducing fluid flow resistance on the elongate member.

2. The member of claim 1 further comprising a second elongate substantially uninterrupted flow transition inducing structure positioned on and extending along a substantial longitudinal length of the outer surface of the elongate member transverse to the fluid flow in the range of 50° to 80° away from the fluid flow for further reducing the fluid flow resistance on the elongate member.

3. The member of claim 2 in which the first and second flow transition inducing structures are protuberances extending above the outer surface of the elongate member.

4. The member of claim 3 in which the protuberances each have a leading edge and a trailing edge, the trailing edge being thicker than the leading edge.

5. The member of claim 4 in which the protuberances each have a tear drop shaped cross section.

6. The member of claim 1 in which the elongate member is cylindrical in shape.

7. The member of claim 2 in which the first and second flow transition inducing structures are positioned on opposite sides of the outer surface of the elongate member.

8. The member of claim 7 in which the first and second flow transition inducing structures are each positioned at about 65° away from the fluid flow.

9. The member of claim 5 in which the protuberances are in the range of 0.001 to 0.100 inches thick.

10. The member of claim 9 in which the protuberances are in the range of 1/16 to 5/8 inches long.

11. The member of claim 6 in which the elongate member is an exhaust stack on a truck.

12. An elongate member for positioning transverse to a fluid flow, the elongate member being cylindrical in shape with a curved outer surface, a first elongate substantially uninterrupted flow transition inducing structure being positioned on and extending along a substantial longitudinal length of the outer surface of the elongate member transverse to the fluid flow in the range of 50° to 80° away from the fluid flow, a second elongate substantially uninterrupted flow transition inducing structure positioned on an opposite side of the outer surface from the first flow transition inducing structure and extending along a substantial longitudinal length of the outer surface of the elongate member transverse to the fluid flow in the range of 50° to 80° away from the fluid flow, the first and second flow transition inducing structures reducing fluid flow resistance on the elongate member.

13. A method of reducing fluid flow resistance on an elongate member positioned transverse to a fluid flow, the elongate member having a curved outer surface, the method comprising the step of:

positioning a first elongate substantially uninterrupted flow transition inducing structure on and extending along a substantial longitudinal length of the outer surface of the elongate member transverse to the fluid flow in the range of 50° to 80° away from the fluid flow.

14. The method of claim 13 further comprising the step of positioning a second elongate substantially uninterrupted flow transition inducing structure on and extending along a substantial longitudinal length of the outer surface of the elongate member transverse to the fluid flow in the range of 50° to 80° away from the fluid flow.

15. The method of claim 14 in which the flow transition inducing structures are protuberances extending above the outer surface of the elongate member, the method further comprising the step of forming a leading edge and trailing edge on the protuberances, the trailing edge being thicker than the leading edge.

16. The method of claim 15 further comprising the step of shaping the protuberances to have tear drop-shaped cross sections.

17. The method of claim 16 further comprising the step of shaping the elongate member into a cylinder.

18. The method of claim 17 further comprising the step of positioning the flow transition inducing structures on opposite sides of the outer surface of the elongate member at about 65° away from the fluid flow.

* * * * *